(12) United States Patent
Lee et al.

(10) Patent No.: US 6,264,384 B1
(45) Date of Patent: Jul. 24, 2001

(54) MULTI-FUNCTIONAL APPARATUS HAVING A SMALL SIZE AND METHOD FOR SAME

(75) Inventors: Hyun-Jun Lee, Kyonggi-do; Seong-Woo Kim, Seoul, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/222,823

(22) Filed: Dec. 30, 1998

(30) Foreign Application Priority Data

Dec. 30, 1997 (KR) .................................................. 97-78239

(51) Int. Cl.⁷ ...................................................... B41J 19/30
(52) U.S. Cl. ................................. 400/322; 347/3; 347/37
(58) Field of Search .............................. 400/322; 347/2, 347/3, 4, 5, 22, 23, 29, 32, 33, 35, 37, 102, 104

(56) References Cited

U.S. PATENT DOCUMENTS

| | | | |
|---|---|---|---|
| 5,049,999 | * 9/1991 | Stemmle | 347/3 |
| 5,563,712 | * 10/1996 | Nohata | 347/3 |
| 5,825,381 | * 10/1998 | Choo | 347/37 |
| 5,946,009 | * 8/1999 | Youn | 347/3 |
| 6,015,204 | * 1/2000 | Ha | 347/3 |

* cited by examiner

*Primary Examiner*—Eugene Eickholt
(74) *Attorney, Agent, or Firm*—Robert E. Bushnell, Esq.

(57) ABSTRACT

Disclosed is a multi-functional apparatus having a small size. The multi-functional apparatus according to the present invention includes a body including a section for transferring a recordable paper and a service station formed at an outside of the recordable paper transferring section; a guide mounted along an entire width of the body in a vertical direction to be normal to a recordable paper transferring direction; and a carriage which has a printhead and a scanner module mounted thereon and moves reciprocally along the guide to be across the recordable paper transferring section, the carriage being positioned in the service station when a scanning or printing operation is normally completed, wherein the scanner module is mounted on the carriage to be adjacent to the recordable paper transferring section with reference to the printhead.

19 Claims, 4 Drawing Sheets

MULTI-FUNCTIONAL APPARATUS HAVING A SMALL SIZE AND METHOD FOR SAME

CLAIM OF PRIORITY

This application makes reference to, incorporates the same herein, and claims all rights accruing thereto under 35 U.S.C. §119 through the patent application entitled A Multi-functional Apparatus Having a Small Size earlier filed in the Korean Industrial Property Office on Dec. 30, 1997 and there duly assigned Serial No. 1997/78239.

BACKGROUND OF THE INVENTION

1. Field of the Invention

The present invention relates to a multi-functional apparatus and, more particularly, to a multi-functional apparatus having a reduced size due to the mounting of both a printhead and a scanner module in a carriage.

2. Background Art

Generally, a multi-functional apparatus is referred to a device including a scanner, a copier, a printer, a facsimile device and a modem, which is connected with a computer to print or store data scanned by the scanner or transferred through the modem from the other system in a hard disk of the computer. Thus, the multi-functional apparatus can act as the facsimile device, the printer, the scanner and the printer.

The scanner used in the multi-functional apparatus having functions of the printer, the scanner, the facsimile device, and the copier is divided in a sheet feed type scanner and a flat bed type scanner. The sheet feed type scanner is mainly used in a facsimile device, which scans data on a document a line by line while feeding the document. On the other hand, the flat bed type scanner is mainly used in a copier, which scans data on a document disposed on a flat bed while moving in a main scanning direction. A multi-functional apparatus having the sheet feed type scanner is provided with a facsimile device using ink or toner depending on a printing manner and a section for interfacing with a personal computer. However, a multi-functional apparatus having the flat bed type scanner is provided with a printer and a facsimile device.

In the multi-functional apparatus having the sheet feed type scanner, there is a disadvantage in that since both a scanner module and a printhead are separately incorporated into the multi-functional apparatus, the entire size of the multi-functional apparatus is increased.

SUMMARY OF THE INVENTION

Accordingly, it is an object of the present invention to provide a multi-functional apparatus that can be manufactured with a smaller size.

It is another object to provide a multi-functional apparatus that has a reduced manufacturing a cost.

To achieve these and other objects, according to an embodiment of the present invention, there is provided a multi-functional apparatus having a small size that may be constructed using a body including a section for transferring a recordable paper and a service station formed at an outside of the recordable paper transferring section, a guide mounted along an entire width of the body in a vertical direction to be normal to a recordable paper transferring direction, and a carriage which has a printhead and a scanner module mounted thereon and moves reciprocally along the guide across the recordable paper.

The scanner module is mounted on the carriage to be adjacent to the recordable paper transferring section with reference to the printhead. The service station is selectively positioned at a right side or a left side of the recordable paper transferring section. The printhead according to the embodiment of the present invention is an inkjet printhead. The scanner module is mounted to be adjacent to an outside of a character recognizing region of the recordable paper transferring section.

BRIEF DESCRIPTION OF THE DRAWINGS

The above object and other advantages of the present invention will become more apparent by describing in detail the preferred embodiment thereof with reference to the attached drawings, in which.

DETAILED DESCRIPTION OF THE DRAWINGS

Figure 1:
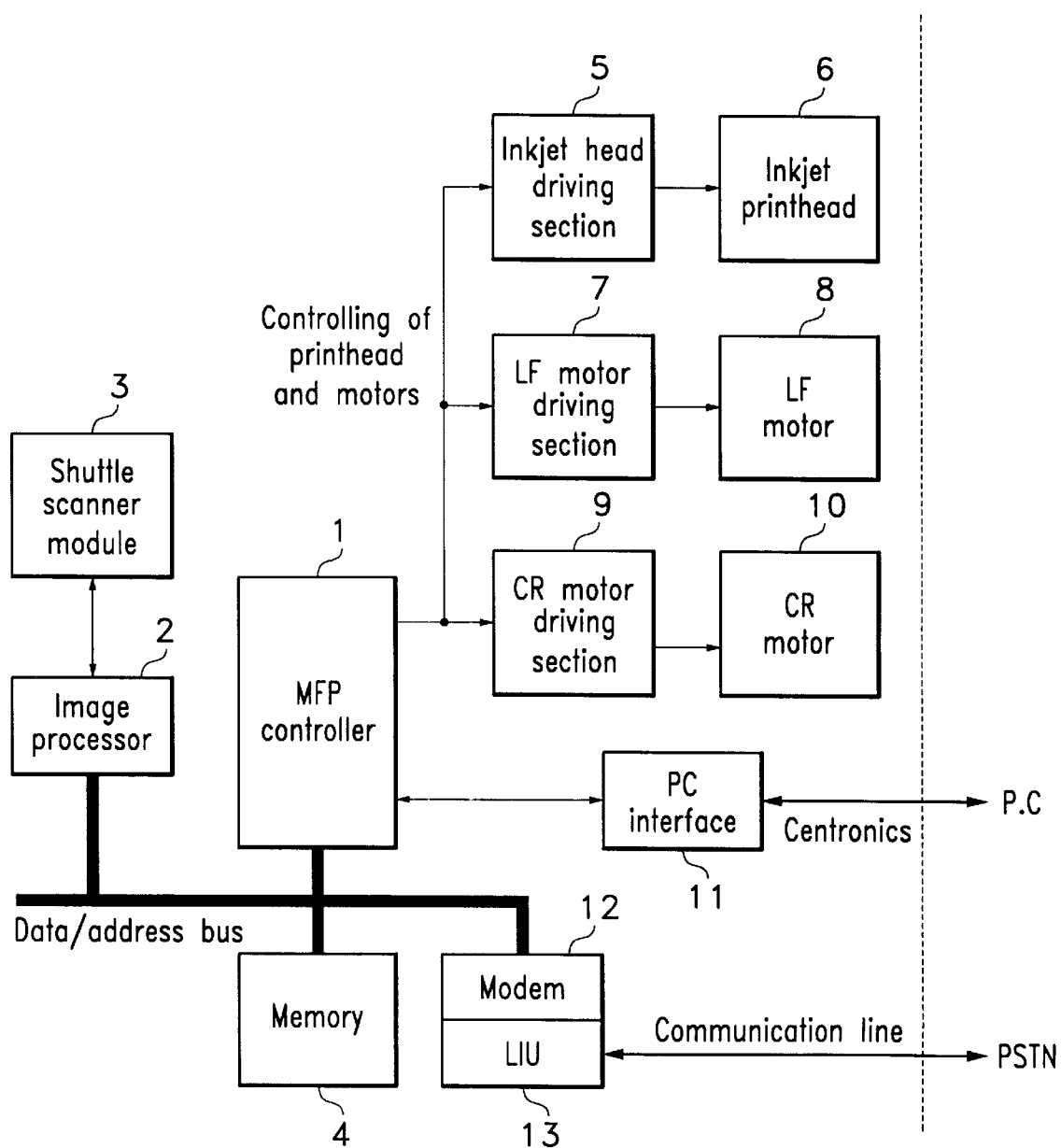
FIG. 1 is a block diagram showing an entire structure of a multi-functional apparatus according to the present invention.

Turning now to the drawings, FIG. 1 illustrates a block diagram of the multi-functional apparatus according to the present invention. A multi function peripheral controller 1 (hereinafter, referred to as MFP controller) controls an entire system of the multi-functional apparatus. The MFP controller 1 controls a memory 4 containing a system driving program and an image processor 2 so that a shuttle scanner module 3 scans image data or the image processor 2 processes the image data. That is, the image processor 2 rasterizes the image data scanned by the scanner module 3. Further, the MFP controller 1 controls a modem 12 and LIU, line interface unit, 13 in order to transfer facsimile image data processed by the image processor. In addition, the MFP controller 1 controls an interface 11 to transfer the data to the personal computer P.C. as well as controls an inkjet head driver 5, a LF, line feed, motor driver 7, and a CR, carriage return, motor driver 9 to print data transferred from the personal computer and facsimile data received by a facsimile device.

More particularly, the image processor 2 performs a shading and gamma correction, an edge emphasis, and an error diffusion of the image data scanned by the shuttle type scanner module 3.

The memory 4 includes an EPROM containing a system program, a SRAM for processing system data, and a DRAM for storing printing data, scanned data, and image data received by the facsimile device. The interface II is a module for interfacing with the personal computer and transfers the scanned data to the personal computer and receives the printing data from the personal computer.

On the other hand, the inkjet printhead driver 5 is operated according to the control of the MFP controller 1 and the LF motor driver 7 and the CR motor driver 9 receive control signals for a phase and a position of a carriage motor from the MFP controller 1 so as to drive the LF motor 8 and the CR motor 10. The modem 12 modulates the image data to communicate with the other facsimile device and the LIU 13 makes the multi-functional apparatus to connect with the PSTN.

Figure 2:
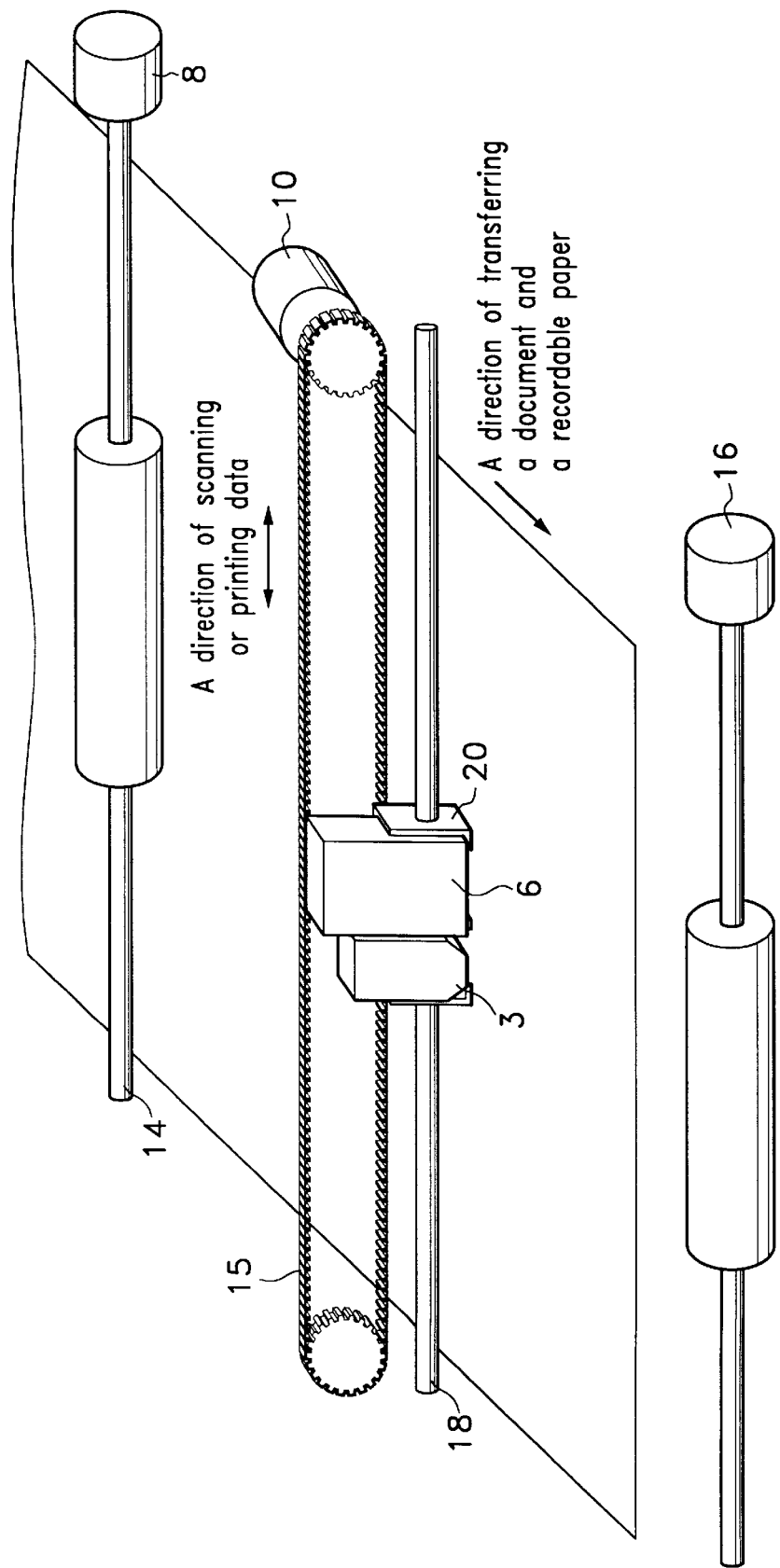
FIG. 2 is a schematic view of a carriage including a printhead and a scanner in the multi-functional apparatus according to the present invention.

In the multi-functional apparatus having the shuttle type scanning module, as shown in FIG. 2, the LF motor 8 makes the document or the recordable paper to be moved through the paper transferring section while the scanning module and the inkjet printhead module are reciprocally moved along the guide shaft and across the width of the document or the recordable paper to scar the document or to print the data on the recordable paper.

Figure 3:
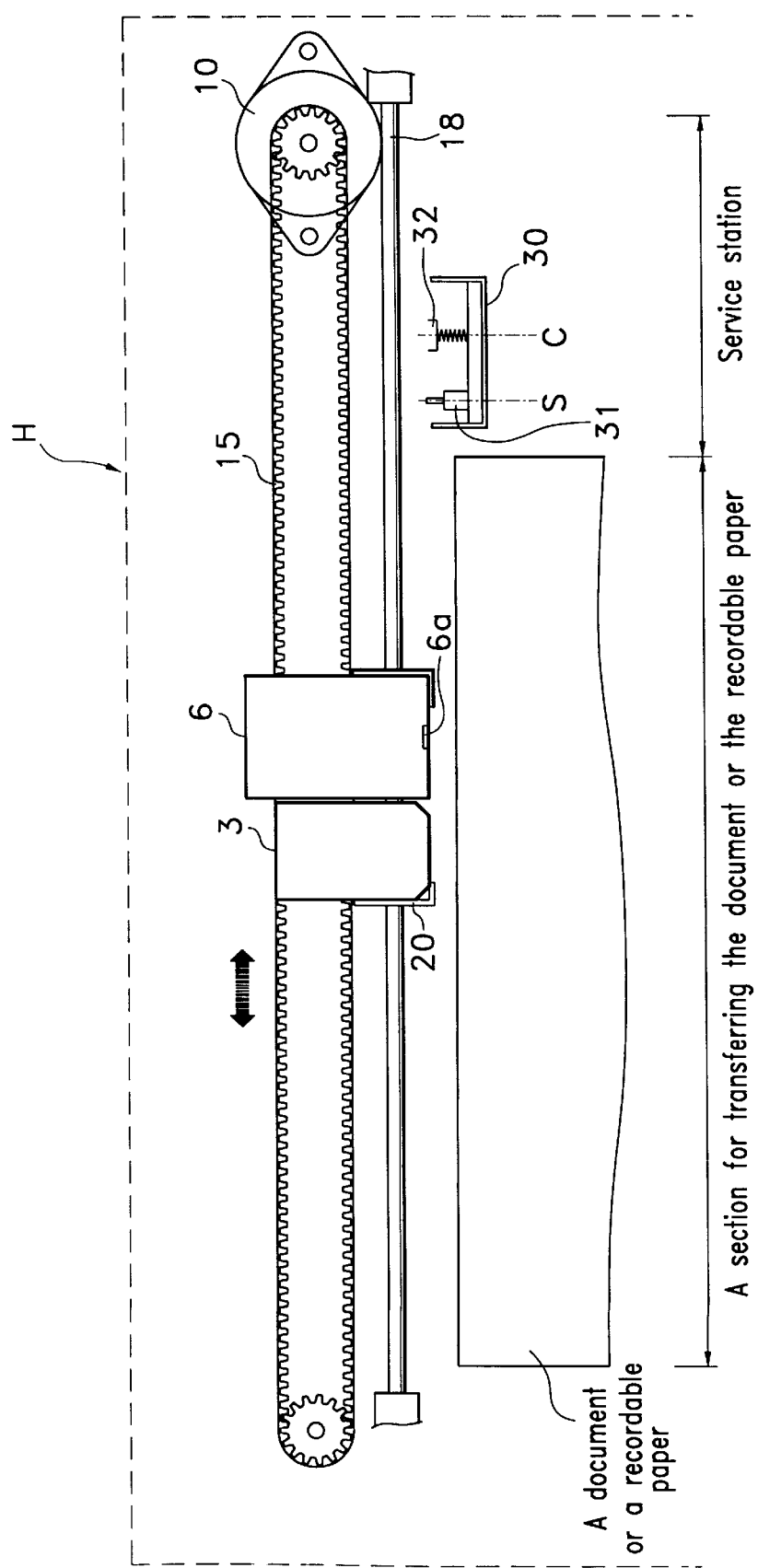
FIG. 3 is a of the multi-functional apparatus according to the present invention, which shows a movement of the carriage.

Referring to FIG. 3, the multi-functional apparatus according to the present invention includes the scanning module 3 and the inkjet printhead 6 mounted on the carriage 20 enclosed in a housing H which is reciprocally moved along the guide shaft 18. The scanning module 3 is provided with a charge coupled device board, a lens, and a light emitting source and the inkjet printhead 6 includes nozzles 6a.

According to the present invention, the scanning module 3 is mounted on the carriage 20 to be near the paper transferring section. That is, the inkjet printer is divided into the paper transferring 8 section in which the document or the recordable paper is transferred and the service station in which the scanning module 3 and the inkjet printhead 6 stay when the scanning or printing stop. The scanning module 3 is mounted together with the inkjet printhead 6 on the carriage 20 to be positioned near the paper transferring section.

Preferably, the scanning module 3 is mounted to be disposed at an outside of the character recognizing region of the paper transferring section.

According to the embodiment of the present invention, moreover, the service station is present at the left side of the paper transferring section. The scanning module 3 is disposed at the side of the inkjet printhead 6 on the carriage 20. However, the service station is present at the right side of the paper transferring section. In the above case, the scanning module 3 is positioned at the right side of the inkjet printhead 6 on the carriage 20.

On the other hand, the carriage 20 is driven by means of a driving force of the CR motor 10. That is, the driving force generated by the CR motor 10 is transferred to the timing belt 15 to drive the carriage 20 connected to the timing belt 15. Thus, the scanning module 3 and the inkjet printhead 6 on the carriage 20 are moved along the guide shaft 18.

Also, the inkjet printhead 6 is reciprocally moved by the CR motor 10 along the guide shaft 18 while the inkjet printhead 6 injects ink through the nozzles 6a to print the data on the recordable paper. The LF motor 8 feeds the recordable paper.

When a position detecting sensor 31 detects the inkjet printhead 6 during the printing operation, the inkjet printhead 6 is moved by a controller, such as MFP controller 1, to a position S in the service station 30. On the other hand, the inkjet printhead 6 is moved to an initial position C so that the nozzle 6a of the printhead is closed by a cap 32 for the ink to be prevented from being dried.

Hereinafter, an operation of the multi-functional apparatus having the scanning module according to the present invention will be described in detail.

When the multi-functional apparatus receives a command for printing or scanning operation from a host computer, the carriage 20 is moved along the guide shaft 18 to an end of the guide shaft 18 so that the nozzle 6a of the inkjet printhead 6 is positioned at the position S. Then, the carriage 20 is reciprocally moved along the guide shaft 18 while the inkjet printhead 6 performs the printing operation.

Figure 4:
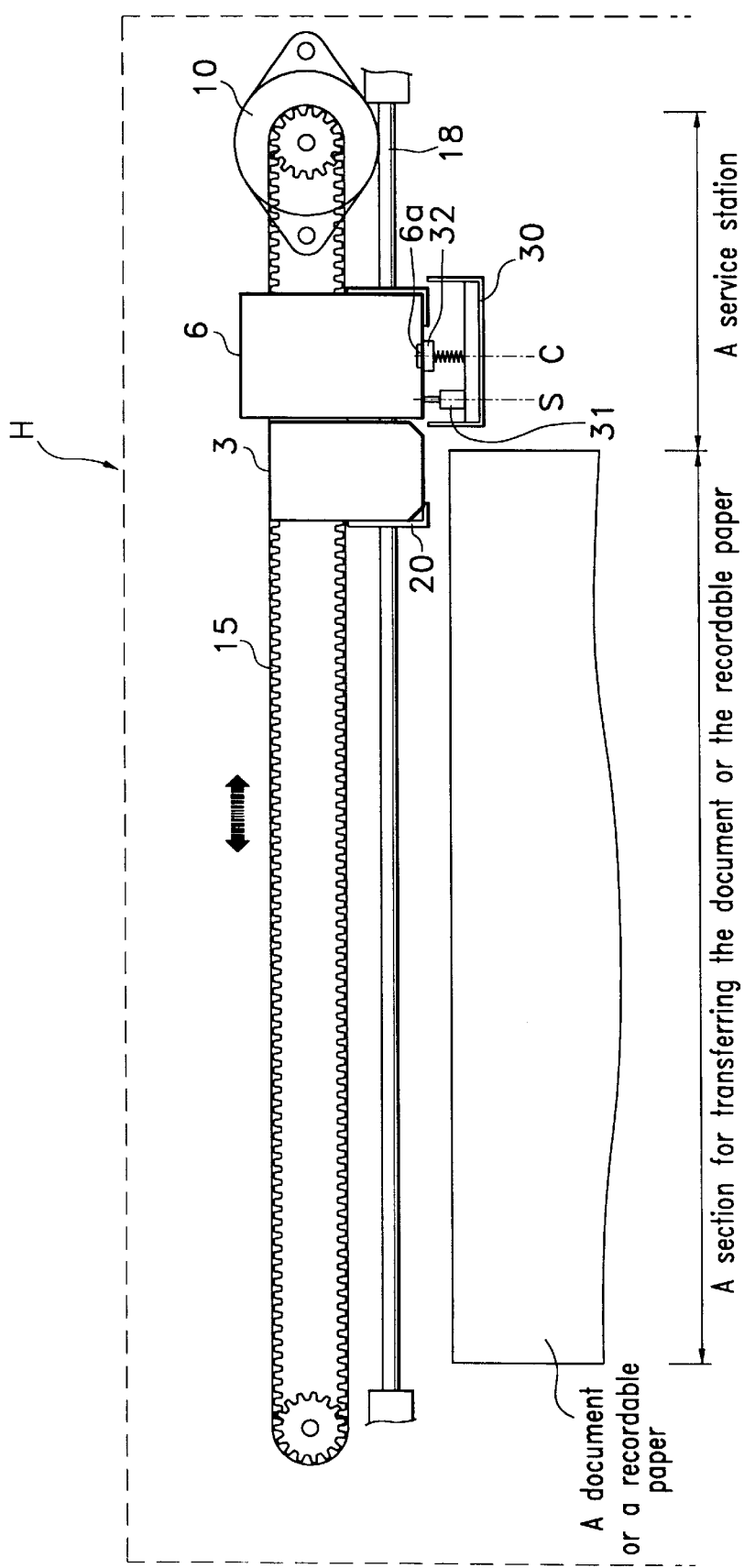
FIG. 4 is a view of the multi-functional apparatus according to the present invention, in which the printhead on the carriage is positioned in a service station.

When the printing operation is completed, the carriage 20 enclosed in the housing H is moved along the guide shaft 18 to the service station 30. As shown in FIG. 4, when the position detecting sensor 31 detects the carriage 20, the controller controls the inkjet printhead 6 so that the nozzle 6a is engaged with the cap 32 in the service station 30.

At that time, the scanning module 3 is positioned at a position outside the service station 30 near the paper transferring section as illustrated in FIG. 4.

As described above, since it is possible to make the carriage 20 having the scanning module 3 and the inkjet printhead 6 mounted thereon move reciprocally along a small length of the guide shaft. As a result, there is an advantage in that the multi-functional apparatus can be made to be small.

That is, the scanning module 3 is mounted to be adjacent to the character recognizing region and the printhead 6 is disposed to be at the side of the scanning module 3, thereby making the multifunctional apparatus to have a small width.

According to the present invention, as described above, it is possible to make the carriage having the scanning module and the inkjet printhead to be moved along the small length of the guide shaft, thereby making the multi-functional apparatus to be small. Accordingly, a manufacturing cost of the multi-functional apparatus can be reduced.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A multi-functional apparatus, comprising:
a body including a section for transferring a recordable paper and a service station formed at an outside of the recordable paper transferring section;
a guide mounted along an entire width of the body in a vertical direction to be normal to a recordable paper transferring direction; and
a carriage which has a printhead and a scanner module mounted on the carriage, the carriage for moving reciprocally along the guide across the recordable paper transferring section, the carriage being positioned in the service station when a corresponding one of a scanning operation and a printing operation is completed,
the scanner module being mounted on the carriage to be adjacent to the printhead along the vertical direction at a position opposite to the service station.

2. The multi-functional apparatus as claimed in claim 1, further comprised of the service station being positioned at a right side of the recordable paper transferring section.

3. The multi-functional apparatus as claimed in claim 1, further comprised of the service station being positioned at a left side of the recordable paper transferring section.

4. The multi-functional apparatus as claimed in claim 1, further comprised of the printhead being an inkjet printhead.

5. The multi-functional apparatus as claimed in claim 1, further comprised of the scanner module being mounted to be adjacent to an outside of a character recognizing region of the recordable paper transferring section.

6. A multi-functional apparatus, comprising:
a body including a section for transferring a recordable paper and a service station formed at an outside of the recordable paper transferring section;
a guide mounted along an entire width of the body in a vertical direction to be normal to a recordable paper transferring direction; and a carriage which has a printhead and a scanner module mounted on the carriage, the carriage for moving reciprocally along the guide across the recordable paper transferring section, the carriage being positioned in the service station when a corresponding one of a scanning operation and a printing operation is completed, the scanner module being mounted on the carriage to be adjacent to the recordable paper transferring section with reference to the printhead whereby only the printhead is introduced into the service station when the corresponding one of the printing operation and the scanning operation is completed.

7. A multi-functional apparatus, comprising:

a shuttle type scanner module for scanning a document; and a printhead which is moved together with the shuttle type scanner module, the printhead for printing data on a recordable paper, whereby the shuttle type scanner module is mounted adjacent to the printhead at a position so is to be located outside of a service station for the printhead when the printhead is introduced into the service station.

8. A multi-functional apparatus for a printer, comprising:

a housing enclosing a carriage that moves along a path in a rectilinear reciprocal fashion;

a printing cartridge mounted on said carriage for forming images on a sheet of paper, a scanning module mounted on said carriage adjacent to said printing cartridge, said scanning module for reading images from a sheet of paper; and a service station mounted in said housing at one end of a paper path in said multi-functional apparatus, said service station for receiving and servicing only said printing cartridge.

9. The multifuctional apparatus of claim 8, further comprising:

a first motor for driving said carriage in said rectilinear reciprocal fashion;

a second motor for advancing a sheet of paper, in a line fashion, along said paper path through said multi-functional apparatus; and a controller for operating said first motor, said second motor, said printing cartridge, and said scanning module.

10. The multi-functional apparatus of claim 9, further comprising:

a computer interface for electrically connecting said controller with a computer;

a modem for transmitting data from said scanning module;

an image processor for receiving a plurality of data from said scanning module; and a memory for use by said controller.

11. The multi-functional apparatus of claim 9, further comprising:

a position detecting sensor positioned in said housing and in communication with said controller, said position detecting sensor for determining when said carriage is at a predetermined position along said paper path; and said controller for causing a cap to cover a nozzle of said printing cartridge when said printing cartridge is at said predetermined position.

12. The multi-functional apparatus of claim 8, further comprising a position detecting sensor for determining when said carriage is at a predetermined position along said paper path.

13. The multi-functional apparatus of claim 12, further comprised of a nozzle of said printing cartridge being covered by a cap when said printing cartridge is at said predetermined position.

14. A method for scanning and printing in a multi-functional apparatus, comprising the steps of:

positioning a scanning module for scanning a document adjacent to a printhead for printing data on a recordable paper;

moving said printhead together with said scanning module for one of scanning the document and printing data on the recordable paper; and positioning only said printhead at a service station for the printhead at a conclusion of a corresponding one of a scanning operation and a printing operation.

15. The method of claim 14, further comprising the steps of:

providing a position-detecting sensor for determining when a carriage on which said scanning module and said printhead are mounted is at a predetermined position along a paper path in said multi-functional apparatus; and causing a cap to cover a nozzle of said printhead when said printhead is at said predetermined position.

16. The method of claim 15, further comprised of said scanning module being a shuttle type scanning module.

17. The method of claim 16, further comprised of said printhead comprising a printing cartridge.

18. The method of claim 14, further comprised of said scanning module comprising a shuttle type scanning module.

19. The method of claim 18, further comprised of said printhead comprising a printing cartridge.

* * * * *